(12) United States Patent
Hayes

(10) Patent No.: US 6,210,955 B1
(45) Date of Patent: Apr. 3, 2001

(54) FOAM TRANSPORT PROCESS FOR IN-SITU REMEDIATION OF CONTAMINATED SOILS

(75) Inventor: Thomas D. Hayes, Schaumburg, IL (US)

(73) Assignee: Gas Research Institute, Chicago, IL (US)

( * ) Notice: Subject to any disclaimer, the term of this patent is extended or adjusted under 35 U.S.C. 154(b) by 0 days.

(21) Appl. No.: 08/318,462

(22) Filed: Oct. 5, 1994

(51) Int. Cl.$^7$ ........................................................ B09B 3/00
(52) U.S. Cl. ........................ 435/262.5; 252/61; 252/351
(58) Field of Search .................................. 166/268, 269, 166/275, 309; 210/610; 252/61, 351; 405/128; 435/262.5

(56) References Cited

U.S. PATENT DOCUMENTS

| | | | |
|---|---|---|---|
| 3,195,634 | 7/1965 | Hill | 166/42 |
| 3,373,009 | 3/1968 | Pruitt et al. | 71/28 |
| 3,417,171 | 12/1968 | Eberle et al. | 264/51 |
| 3,466,873 | 9/1969 | Present | 61/35 |
| 3,707,193 | 12/1972 | Smith et al. | 166/303 |
| 3,713,404 | 1/1973 | Lavo et al. | 111/1 |
| 3,787,316 | 1/1974 | Brink et al. | 210/6 |
| 3,799,755 | 3/1974 | Rack | 71/24 |
| 3,822,750 | 7/1974 | Ping | 166/309 |
| 3,891,571 | 6/1975 | Lambou et al. | 252/354 |
| 3,953,338 | 4/1976 | Straus et al. | 252/8.5 C |
| 4,203,837 * | 5/1980 | Hoge | 210/44 |
| 4,401,569 | 8/1983 | Jhaveri et al. | 210/610 |
| 4,435,292 * | 3/1984 | Kirk | 210/747 |
| 4,681,164 | 7/1987 | Stacks | 166/304 |
| 4,850,745 | 7/1989 | Hater et al. | 405/258 |
| 4,997,592 | 3/1991 | Woogerd | 252/354 |
| 5,008,019 | 4/1991 | Trost | 210/747 |
| 5,059,252 | 10/1991 | Renfro, Jr. | 134/7 |
| 5,061,119 | 10/1991 | Balthaus et al. | 405/128 |
| 5,074,358 | 12/1991 | Rendall et al. | 166/273 |
| 5,076,357 | 12/1991 | Marquis | 166/273 |
| 5,088,856 | 2/1992 | Yocum | 405/128 |
| 5,172,709 | 12/1992 | Eckhardt et al. | 134/95.1 |
| 5,203,413 | 4/1993 | Zerhboub | 166/281 |
| 5,368,411 * | 11/1994 | Losack | 405/128 |
| 5,372,200 * | 12/1994 | Merrill | 166/369 |

OTHER PUBLICATIONS

Gannon, O., Environmental Reclamation . . . Diss Abstracts Int 50 (3) 1989 p. 975B.*
Lindgren E., Electrokinetic Remediation . . . ACS Symp Ser (1994) 554 pp. 33–50.*
Gannon, Oliver Keith, Ph.D., "Environmental Reclamation Through Use Of Colloid Foam Flotation, In–Situ Soil Aeration And In–Situ Surfactant Flushing," Vanderbilt University, 1988, 177pp.
Nutt, C.W. et al., "The Influence of Foams Rheology in Enhanced Oil Recovery Operations," pp. 105–147, Foams: Physics, Chemistry and *Structure,* edited by A.J. Wilson, Springer–Verlag, New York, NY, 1989.
Kelley, R.L. et al., "Field–Scale Evaluation of an Integrated Treatment for Remediation of PAH's in Manufctured Gas Plant Soils," Institute of Gas Technology, Chicago, Illinois, 1991.
Wunderlich, R.W., "In Situ Remediation of Aquifers Contaminated with Dense Nonaqueous Phase Liquids by Chemically Enhanced Solubilization," *Journal of Soil Contamination,* 1(4):361–31, 1992.
Sims, J.L. et al., "In Situ Bioremediation of Contaminated Unsaturated Subsurface Soils," USEPA Engineering Issue No. EPA/540/S–3/501, Robert S. Kerr Environmental Research Laboratory, Ada, OK, 1993.
Brasch, D.J. et al., "Rates of Continuous Foam Fractionation of Dilute Kraft Black Liquor," *Separation Science and Technology,* 14:6–70, 1979.

\* cited by examiner

Primary Examiner—Ralph Gitomer
(74) *Attorney, Agent, or Firm*—Pauley, Petersen Kinne & Fejer

(57) ABSTRACT

A process for in-situ remediation of contaminated soil in which at least one treating agent is introduced into the contaminated soil and transported to an underground in-situ treatment zone of the contaminated soil by a foam-based fluid.

16 Claims, 2 Drawing Sheets

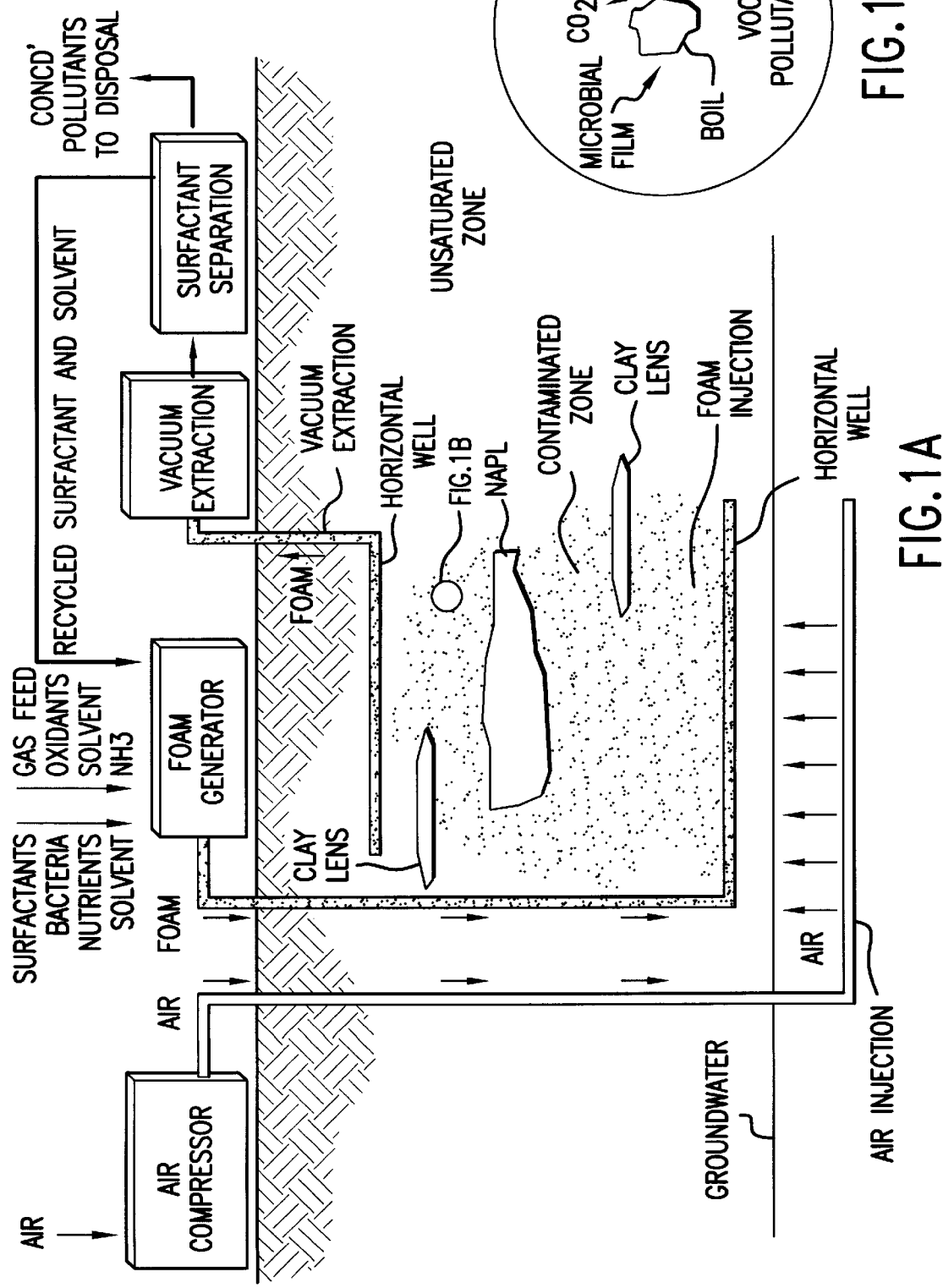

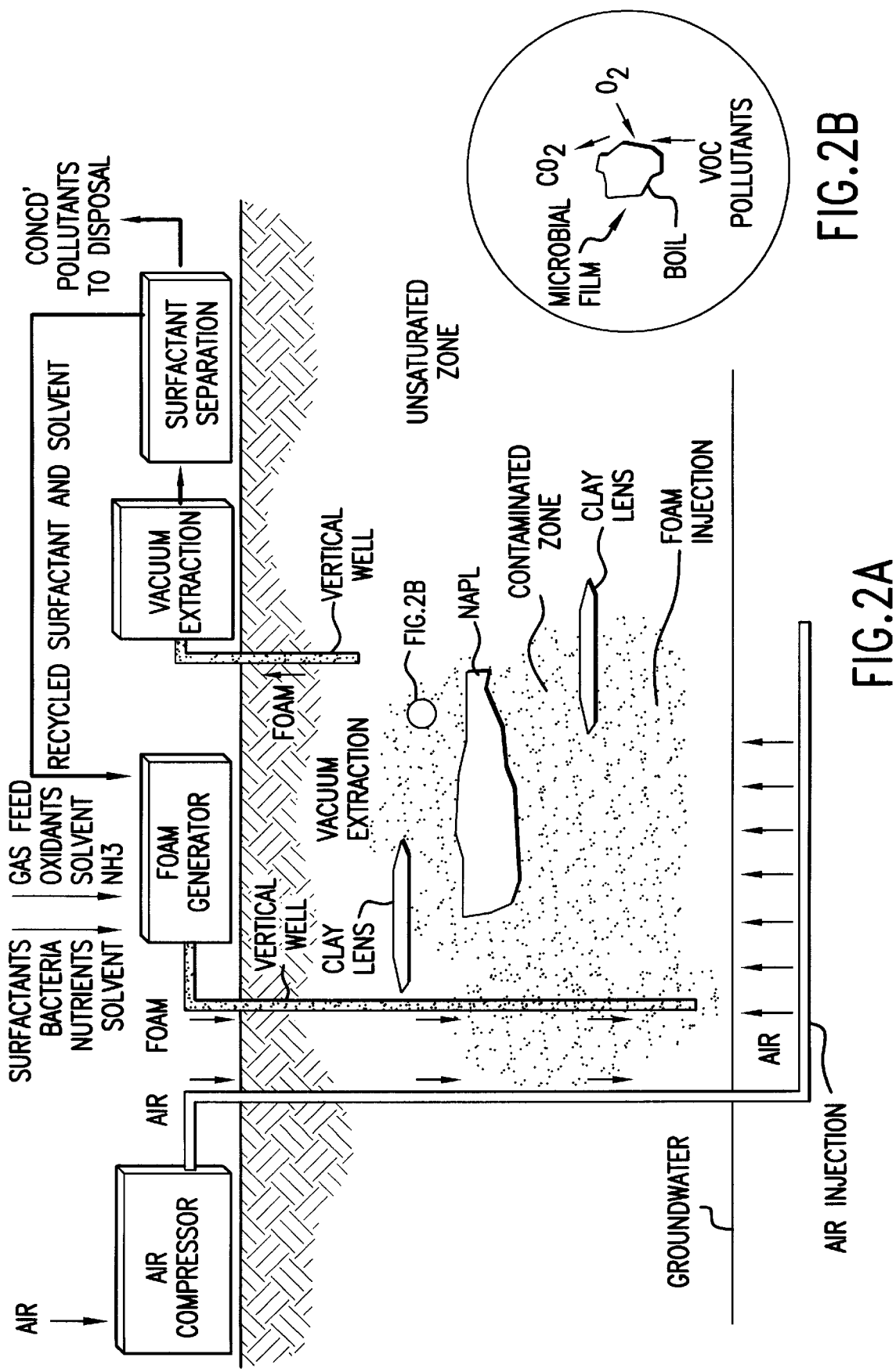

FOAM TRANSPORT PROCESS FOR IN-SITU REMEDIATION OF CONTAMINATED SOILS

BACKGROUND OF THE INVENTION

1. Field of the Invention

This invention relates to a process for in-situ remediation of contaminated soils by the addition of certain treatment agents, such as chemicals to enhance mass transfer of pollutants from soils and non-aqueous phase liquids and to stimulate bacteria to degrade organic pollutants. More particularly, this invention relates to an improved method for the delivery of chemicals for enhancing bioremediation and for the physico-chemical separation and removal of pollutants from contaminated soil and groundwater whereby the pollutants are desorbed from the soil and non-aqueous phase liquids, such as tar and oil, and are available for biodegradation and/or physical removal from the soil by a mobile foam fluid phase. This invention also relates to a method for enhancing electrokinetic, electromagnetic and radio frequency (RF) in-situ treatment processes for in-situ treatment of inorganic and hydrocarbon pollutants in contaminated soils using foams.

2. Description of Prior Art

The conventional method for chemical enhancement of in-situ treatment of contaminated soils consists of the introduction of chemicals using hundreds of thousands of gallons of water into the soil subsurface using infiltration galleries. The main disadvantage of this technique is that the water carrier stream provides poor penetration into clay lenses and non-aqueous phase liquids and moves in a downward direction, due to gravity, into the underlying groundwater.

Subsurface contamination of soil is typically caused by spills or waste impoundments that have leaked over many years and have been observed at a variety of industry and government-owned facilities. Such sites include abandoned manufactured gas plants which release tars and polynuclear aromatic hydrocarbons (PAH's), creosote treatment sites which release tars, PAH's, and pentachlorophenol, spills at refineries which release oils and PAH's, gas dehydration facilities which release triethylene glycol and benzene, toluene, ethylbenzene and xylene, military bases, and oil and gas production pits. Cleanup of contamination in the deep subsurface, that is 4 or more feet below the surface of the soil, is cost-prohibitive to excavate and difficult to treat without considerable risk to the groundwater. As a result, there is a need to develop low-cost environmentally acceptable approaches for in-situ treatment.

Much work has been done in the past to develop various remediation approaches for the removal of pollutants from the soil subsurface such as in-situ bioremediation which has the potential for destroying pollutants in the subsurface at a low cost, for example, by the introduction of chemical enhancements such as Fenton's Reagent (iron/peroxide) and surfactants which promote biodegradation of pollutants in soils contaminated with non-aqueous phase liquids. In particular, surfactants and Fenton's Reagent are known to enhance the desorption of pollutants from the non-aqueous phase liquids and soil, thereby providing controlled solubilization of the pollutants, making them amenable to biological attack. See, for example, Kelley, R. L. et al., "Field-Scale Evaluation of an Integrated Treatment for Remediation of PAH's in Manufactured Gas Plant Soils," Institute of Gas Technology, Chicago, Ill.

The use of chemicals to enhance the desorption of pollutants from non-aqueous phase liquids and soil is also described in the literature for in-situ treatment. See, for example, Wunderlich, R. W., "In Situ Remediation of Aquifers Contaminated with Dense Nonaqueous Phase Liquids by Chemically Enhanced Solubilization," *Journal of Soil Contamination*, 1(4):361–37. Enhancement agents include nutrients, such as ammonia and orthophosphate, solvents, such as methanol and ethanol, and microbial cultures. Biological in-situ treatment occurs when nutrients, oxidants and other enhancements are added to the subsurface to stimulate bacteria in the subsurface to degrade organic pollutants. Various types of biological in-situ designs are discussed in the literature, for example Wunderlich et al. cited hereinabove and Sims, J. L. et al., "In Situ Bioremediation of Contaminated Unsaturated Subsurface Soils," USEPA Engineering Issue No. EPA/540/S-3/501, Robert S. Kerr Environmental Research Laboratory, Ada, Okla. It is believed that the enhancements reported in the literature for soil bioremediation are broadly applicable to the in-situ cleanup of a wide variety of industrial and the government sites. The challenge is in developing a method of delivering the chemical and biological enhancements for in-situ remediation of the subsurface without inadvertently contaminating the underlying groundwater or uncontaminated soils surrounding the contaminated site.

The Sims et al. reference cited hereinabove describes a number of delivery techniques currently in use including gravity infiltration and forced hydraulic delivery, the various designs of which include flooding, ponding, ditches, sprinkler systems, and subsurface injection techniques. All of these conventional methods for delivery of enhancement chemicals to the subsurface pose a considerable risk to groundwater because they involve the gravity flow of hundreds of thousands of gallons of chemical-bearing water streams that can move through contaminated regions of the subsurface, pick up considerable concentrations of pollutants and flow past non-aqueous phase liquids and clay lenses into the underlying and surrounding groundwater aquifers.

The primary problem with water-based delivery systems for chemicals transport in the subsurface is that gravitational forces have a dominating influence over the direction of flow of these fluids, thereby resulting in increased risk to groundwater. In contrast to water-based delivery systems, foam flow in porous media is not dominated by gravity but can be directed in the subsurface by differences of pressure and resistance to flow in the porous media. Aqueous foams are utilized in a number of applications, particularly in petroleum production. These include the use of foam for enhancement of oil recovery and as a selective blocking fluid in heterogeneous reservoirs. Foams are also known to be employed in near-well operations, such as sand clean-out, stimulation and sealing of the formation to control groundwater movement, or losses of injected fluids such as gas in underground gas storage reservoirs. Literature relevant to the application of foams to the recovery of oil from porous media is summarized in Nutt, C. W. et al., "The Influence of Foam Rheology in Enhanced Oil Recovery Operations," pp. 105–147, *Foams: Physics, Chemistry and Structure*, edited by A. J. Wilson, Spronger-Verlag, New York, N.Y. The technical feasibility of utilizing aqueous foams in porous media to mobilize a type of non-aqueous phase liquid for enhanced oil recovery which is performed more than 3,000 feet below the surface is generally disclosed by this body of literature. See also U.S. Pat. Nos. 5,203,413, 5,076,357, 5,074,358, 4,681,164, 3,953,338, and 3,707,193, all of which generally relate to the use of foams for enhancing oil recovery and/or for treating oil wells.

U.S. Pat. No. 3,822,750 teaches a method and apparatus for cleaning wells by forming a foamy aqueous solution at the bottom of the well and forcing a sand-bearing foamy aqueous solution with oil-bearing sand to the top of the well. U.S. Pat. No. 3,195,634 teaches a fracturing process for treating earth formations containing oil or gas deposits in which a composition comprising liquid carbon dioxide and an aqueous fluid as a fracturing fluid is injected as a liquid into the formation to be treated until maximum penetration has been achieved. Pressure at the well head is maintained until the desired action of the treating fluid in the formation has occurred in which the pressure is relieved causing the liquids previously injected into the formation to flow back into the well, liberating carbon dioxide gas in the formation as well as suspended in the aqueous fluid in the form of bubbles. The bubbles pick up residual oil and other matter as they are carried back into the well by an inflowing current of water. The liberated gas creates a gas lift to discharge a fracturing fluid from the formation and return the fracturing fluid to the surface, resulting not only in fracturing, but also cleanout of the formation.

U.S. Pat. No. 4,203,837 teaches foam flotation for removing particulates from waste water; U.S. Pat. No. 4,435,292 teaches a portable system for cleaning contaminated earth in which vertical and/or horizontal perforated pipes are imbedded in the soil around the contaminated area and connected in a closed portable system to a pressure pump in series with an evacuator having a separator and scrubber; U.S. Pat. No. 5,172,709 teaches an apparatus and process for removal of contaminants from soiled or other substrate materials by injection of a hot pressurized liquid, preferably steam, which vaporizes a fraction of the contaminant which is then released through a vapor filter to prevent atmospheric cross-pollution; U.S. Pat. No. 3,787,316 teaches a process for concentrating suspensions of activated sludge using a bubble flotation process in which foam is pumped into the suspension and the bubbles in the foam attach to the solids in the suspension, the air bubbles lifting the solids to which they have become attached and forming a blanket of concentrated sludge. Finally, U.S. Pat. Nos. 5,008,019 and 4,401,569 both relate to treatment of contaminated sites in conjunction with biodegradation. In-situ bioremediation of contaminated soils is also taught by U.S. Pat. No. 5,061,119 which teaches subsurface in-situ remediation by high pressure jet liquid injections of microorganisms, nutrients, etc., serving as a carrier to uniformly distribute treating agents in an underground treatment zone and withdrawal through an adjacent well; U.S. Pat. No. 4,850,745 which teaches bioremediation by placement of bacteria in soil at the bottom of a cavity for petroleum tanks and providing nutrients and air by way of a pipe; and U.S. Pat. No. 5,059,252 which teaches in-situ surface bioremediation by mixing a cation ion exchange resin with contaminated soil to promote growth of microorganisms capable of degrading hazardous waste.

The use of foams in agriculture is taught by U.S. Pat. Nos. 4,997,592, 3,891,571, 3,713,404, 3,373,009, 3,799,755, 3,417,171, and 3,466,873.

The successful application of aqueous foams to enhanced oil recovery suggests that foams can be effectively injected into the ground and used to affect the rheology and flow of non-aqueous phase liquids in the subsurface. However, foams used in the petroleum industry are designed for use at extremely high pressures, on the order of thousands of psi. Because high pressures tend to stabilize these foams, their use in shallow formations, where pollutants are located at contaminated sites, usually less than several hundred feet below the surface, results in a failure to maintain stable bubble formation. In addition, oil-production foam formulations are tailored in rheological properties to achieve specific tasks related to petroleum recovery or gas storage and, thus, are inappropriate for site remediation applications.

The use of foams for separation and transportation of chemicals is also known. Historically, interfacial separation by means of flotation has been known since the turn of the century. In particular, foam fractionation was used to remove sodium-oleate from an aqueous solution to verify the Gibbs adsorption equation. In addition, it has been demonstrated that a wide variety of substances can be removed from solution using flotation methods, which methods have been classified according to their function and application under the general heading of adsorptive bubble separation methods.

Adsorptive bubble techniques are divided into two main groups, foam separation and nonfoaming adsorptive bubble separation. Foam separation requires the generation of a foam for separation while nonfoaming separation does not require the generation of a foam.

Foam separation is further divided into two general categories: foam fractionation, which is the foaming off of dissolved material from a solution by means of adsorption at bubble surfaces, and froth flotation, which is the removal of particulate material by foaming. An example of the froth flotation technology is ore flotation which involves the separation of ore particles from gangue particles by selective attachment to rising bubbles. Other known froth flotation technologies include: macroflotation, the removal of macroscopic particles; microflotation, the removal of microscopic particles such as microorganisms and colloids; ion flotation, the removal of surface-active ions through the use of a surfactant which yields an insoluble product; precipitate flotation, in which a precipitate is removed and the precipitating agent is other than a surfactant; molecular flotation, in which surface-inactive molecules are removed through the use of a surfactant which yields an insoluble product; and adsorbing colloid flotation, the "piggy-back" removal of dissolved material which is first adsorbed on colloidal particles.

In the environmental field, the dissolved air flotation process which involves the dissolving of air in an influent water stream through contact with air in a high pressure chamber followed by a release of the stream into a shallow reaction chamber at atmospheric pressure which causes the release of fine gaseous bubbles from the water fraction, the bubbles impinging on particulate solids and the buoyant force of the combined particle and gas bubbles causing the particles to rise to the surface, has been used commercially for the separation of particulate solids in the treatment of water and waste water. This process is known to be widely effective for sludge treatment and for the treatment of algae-laden waters and low-turbidity, highly-colored waters.

Foam fractionation involves the selective adsorption of a surface-active solute onto the surface of gas bubbles rising through a dilute solution and forming a foam. The foam, when collected and collapsed, forms a concentrated solution of the surface-active solute which is removed from the bulk of the original dilute solution. In a laboratory-scale apparatus, foam fractionation has been used to perform a continuous separation for the purification of pulp and paper mill wastes. See Brasch, D. J. et al., "Rates of Continuous Foam Fractionation of Dilute Kraft Black Liquor," *Separation Science and Technology*, 14:6–70.

SUMMARY OF THE INVENTION

It is an object of this invention to provide a process for in-situ remediation of contaminated soils which provides enhanced mass transfer of pollutants from soils and non-aqueous phase liquids.

It is another object of this invention to provide a process for in-situ remediation of contaminated soils which enhances the stimulation of bacteria to degrade organic pollutants.

It is another object of this invention to provide a process for in-situ remediation of contaminated soils which substantially reduces the risk of adding pollutants to the groundwater due to the effect of gravitational forces compared to conventional methods.

It is another object of this invention to provide a process for in-situ remediation of contaminated soils which provides improved distribution of bioenhancement chemicals to the in-situ treatment zones in the subsurface regions of the soil.

It is another object of this invention to provide a process for enhancing in-situ remediation of contaminated soils by in-situ treatment processes including electrokinetic, electromagnetic and radio frequency heating processes.

These and other objects of this invention are achieved by a process for in-situ remediation of contaminated soils comprising introducing at least one treating agent into the contaminated soil and transporting the treating agent to an underground in-situ treatment zone of the contaminated soil using a foam-based fluid. Treating agents which may be employed in the process of this invention include bioenhancement chemicals such as nutrients, surfactants, oxidants and solvents, and bacterial cultures. In accordance with a preferred embodiment of this invention, the foam-based fluid comprises an organic foam comprising between about 5% and about 50% of a liquid and between about 50% and about 95% of a gas. The foam is utilized as a carrier of the treating agents to the underground in-situ treatment zone, such as chemicals to reduce resistance to the mobile carrier phase in the subsurface, to provide chemical pretreatment in more concentrated forms, and to improve distribution of the treating agents in non-homogenous subsurface environments.

The treating agents employed in the process of this invention promote the controlled desorption of pollutants from the soil and non-aqueous phase liquids, thereby solubilizing the pollutants and making them available for biological attack.

Foams utilized in accordance with the process of this invention are preferably produced by surfactants selected to provide foam stability under the site-specific conditions of soil type, non-aqueous phase liquid type, pollutant type, foam flow, soil porosity, depth of the underground in-situ treatment zone, pressures and the like. Surfactants that may be used to produce the foam used in accordance with the process of this invention include Triton X-100 (Sigma Chemicals) and Tween-80 (Shell Oil Corporation).

In accordance with one embodiment of the process of this invention, foams are produced having charged surface properties which enhance the performance and application of known electrokinetic, electromagnetic and radio frequency (RF) in-situ treatment processes.

As discussed hereinabove, the use of foams for enhanced oil recovery or for enhanced gas recovery is known. However, in function, the action of foams for enhanced oil recovery or for enhanced gas recovery is fundamentally different from the function of foams utilized in the process of this invention for remediation purposes. In enhanced oil recovery processes, the objective is to desorb/displace oil from relatively inert surfaces/pores of petroleum-bearing rock formations so that oil, relatively free from both surfactants and water, can be recovered. Partial recovery of oil is not only acceptable, but it is also standard practice. In foam remediation, by contrast, partial removal of contaminants is unsatisfactory, the objective being to achieve efficient removal of pollutants from soil particles and non-aqueous phase liquids in the subsurface regions. Regulatory cleanup levels for contaminant removal and the relatively low abundance of contaminants in unconsolidated soil at a polluted site in comparison with the amount of oil present in consolidated rock formations encountered in enhanced oil recovery operations requires that the contaminants be removed by solubilization by the foam rather than pushed by the foam.

In view of the different requirements of known technologies employing foams such as for enhanced oil or gas recovery, and for bioremediation in accordance with the process of this invention, the characteristics of the foam become critical to the success of the process employing the foam. Foams which are suitable for enhanced oil or gas recovery are not suitable for use in accordance with the process of this invention.

The requirements for a foam suitable for use in accordance with the process of this invention are as follows:

The foam must be biodegradable. In enhanced oil or gas recovery systems, the biodegradability of foams is not an issue. However, in foam remediation the biodegradation of the surfactants as well as solubilized contaminants is a critical factor.

Foams used for soil remediation are preferably made from non-ionic surfactants. Ionic surfactants such as those commonly employed in enhanced oil or gas recovery systems, sorb to the soil material, thereby becoming lost from the solution. Non-ionic surfactants do not sorb as strongly as ionic surfactants to soil material. In addition, non-ionic surfactants are more compatible with microorganisms which may be employed in the biodegradation process, that is, they are less toxic and more biodegradable.

Foams that are used to extract pollutants from the subsurface in accordance with the process of this invention are subjected to separation of the surfactant from the pollutant/water fraction. The inability to collapse the foam into a fluid, such as would be the case with foams utilized in enhanced oil or gas recovery systems, which foams are highly stable, complicates this separation. In addition, highly stable foams may limit or inhibit the biodegradation of solubilized contaminants and the surfactant material remaining in the soil.

Finally, foams utilized in accordance with the process of this invention comprise organic foams, for example ethanol foams containing nearly 100% organic solvent in the lamella fluid, in contrast to foams utilized in enhanced oil or gas recovery systems which are almost exclusively aqueous foams.

In summary, the ideal surfactant for use in the foam remediation process of this invention has the following characteristics: (1) it is effective in solubilizing pollutants from soil and non-aqueous phase liquids; (2) it is not sorbed strongly to the soils; (3) it is biodegradable and non-toxic/non-lethal to microbes; (4) it is amenable to recovery/separation procedures; (5) it is sufficiently stable to allow movement of the foam through the soil, but not stable enough to prevent collapsing the foam and processing it for above-ground surfactant recovery where foams are used as extraction fluids; (6) it must be stable enough to carry nutrients, chemicals and microorganisms to subsurface regions; and (7) it must be inexpensive and safe.

BRIEF DESCRIPTION OF THE DRAWINGS

These and other objects and features of this invention will be better understood from the following detailed description taken in conjunction with the drawings wherein:

FIG. 1 is a schematic diagram of the foam enhanced bioremediation process of this invention employing horizontal wells for introduction of the foam into the subsurface regions of the soil; and FIG. 2 is a schematic diagram of the foam enhanced bioremediation process of this invention using vertical wells for introduction of the foam into the subsurface regions of the contaminated soil.

DESCRIPTION OF PREFERRED EMBODIMENTS

FIG. 1 shows a schematic diagram of the process for in-situ remediation of contaminated soils in accordance with one embodiment of this invention in which foam is introduced into the underground in-situ contaminated treatment zone through horizontal wells. In particular, the foam having the requisite characteristics for use in accordance with the process of this invention is produced in a foam generator by passing a gas through a finely divided frit submerged in an aqueous solution containing a surfactant and the desired treatment agents, that is, nutrients, trace metals, bacteria, oxidants, solvents, and the like. The surfactant is preferably a non-ionic surfactant which produces a foam which is collapsible in the underground in-situ treatment zone. The gas used for making the foam may also contain nutrients, for example ammonia, nitrous oxide, triethyl phosphate, and the like, or solvents, such as methanol and/or ethanol.

The foam, which is produced under pressure, that is greater than about 30 psig, is introduced under pressure into at least one horizontal injection well into the subsurface region 2 to 20 feet below the contaminated zone. As shown in FIG. 2, the foam is introduced under pressure into vertical wells into said subsurface region. Because gravitational forces on the foam are relatively low compared to buoyant and capillary forces, the flow of the foam is in the lateral and upward direction, away from water saturated soil and toward the vadose region.

Control of the foam is achieved by establishing barriers and pressure differences in the soil to drive the foams to the desired regions in the contaminated subsurface. Slurry walls may also be used to provide further control of the movement of the foam. Even more precise control of foam placement is achieved by establishment of pressure gradients in the soil, for example through combined pressurization of the injection wells and the strategic placement of vacuum extraction wells in the desired direction of foam migration as seen in FIGS. 1 and 2. As the foam moves through the porous soil media, the treatment agents are distributed. If bacteria are introduced into the foam, key functional microorganisms are also distributed throughout the contaminated zone.

Once in place, the foam collapses and solvents and surfactants from the foam are absorbed into the organic non-aqueous phase liquid fraction of the soil, thereby becoming reduced in density and viscosity and, thus, more amenable to the release of pollutants for subsequent biodegradation. Nutrients and bacteria are also delivered to the surface of the contaminated soil and non-aqueous phase liquid interfaces as a result of the foam collapse.

To stimulate bacterial feeding off of the nutrients and supplemental carbon (excess solvent and biodegradable surfactant) for degradation of pollutants in the vapor phase in the unsaturated, vadose zone, oxygen or air are subsequently introduced into the injection well.

In addition to serving as a carrier of treatment agents to an underground in-situ treatment zone for bioremediation thereof, the foams may also be used in accordance with the process of this invention to perform separations and to serve as a carrier of pollutants from contaminated water and subsurface soils. In particular, foams as discussed hereinabove are produced in a foam generator and injected through a foam injection well, either a horizontal or vertical well into the subsurface region below the contaminated soil treatment zone. Thereafter, the foam flows through the contaminated treatment zone, desorbing pollutants and carrying the pollutants with the foam to a vacuum extraction well by which the foam is removed from the subsurface and carried to a foam separator. The surfactant used to generate the foam is recovered in a separator and recycled to the foam generator while the concentrated pollutant stream is collected and disposed of, due to the pollutants being contained in a small volume of waste, at a reduced cost. More particularly, the process for in-situ remediation of contaminated soils in accordance with this embodiment of this invention comprises introduction of a foam produced in a foam generator by passing a gas through a finely divided frit submerged in an aqueous solution containing a surfactant and additives through a vertical and/or horizontal foam injection well located below the contaminated zone to be remediated. Additives in the aqueous solution containing the surfactant comprise peanut oil, solvents such as methanol and/or ethanol, oxidants such as ozone and/or peroxide and heavy-metal chelating agents, for example EDTA, which promote desorption of pollutants from non-aqueous phase liquids and/or soil into the foam phase.

The foam, which is formulated to selectively desorb and separate targeted pollutants from the soil and non-aqueous phase liquids and transport the pollutants from the subsurface, comprises various bubble sizes from macro-bubble sizes, about 0.1–5 millimeters in diameter, down to micro-bubble sizes, about 10–100 microns in diameter, to achieve the desired flow characteristics through porous media. Foam chemistry factors and bubble configurations provide the desired stability in the subsurface foam remediation system.

As in the embodiments of the process discussed hereinabove, the foam, which is produced under pressures greater than about 30 psig, is introduced under pressure into vertical or horizontal injection wells into the contaminated zone. Because gravitational forces on the foam are relatively low compared to buoyant and capillary forces, the flow of the foam is in the lateral and upward direction, away from water-saturated soil and toward the vadose region.

In accordance with one embodiment, air is injected intermittently in the foam injection well or continuously in another vertical or horizontal well located 2–10 feet below the foam injection well to allow surfactant fluids draining from the foams to be reconverted into foams in the underground in-situ treatment zone. At the same time, a vacuum of about minus 40–200 inches gauge pressure is pulled on the horizontal or vertical vacuum extraction well to provide a negative pressure in the region of the extraction well. Regenerative blowers which exert a minus 40 inches of gauge pressure and liquid-ring pumps which exert up to minus 200 inches of gauge pressure of vacuum for many kinds of soils may be employed. In this manner, a pressure gradient is established in the soil for the flow of the foam from the high-pressure injection wells toward the low-pressure vacuum extraction well.

To provide further control of foam flow through the contaminated zone, slurry walls may be installed.

As the foam flows through the contaminated zone, pollutants are desorbed from the soil and non-aqueous phase liquid, adsorbed and absorbed into the foam fluids, and carried with the foam out of the subsurface regions into the vacuum extraction wells. The foam is then carried to a surfactant recovery process in which the foam is collapsed and the surfactant mixture subjected to separation processes, such as distillation, molecular sieve fractionation, ultrafiltration, solvent/solvent extraction or ion exchange, to recover surfactants and solvents which can then be recycled to the foam generator.

Pollutants which may be removed using the process of this invention include organics, heavy metals, salts, and radionuclides. In many cases, the foams which are utilized may be designed to remove a large fraction of the non-aqueous phase liquid itself.

A system for in-situ remediation of contaminated soils in accordance with one embodiment of this invention comprises foam generation means for generating a foam, vertical and/or horizontal foam injection wells disposed below the contaminated zone to be remediated, vacuum extraction means for generating a negative pressure area above the contaminated zone to be remediated, air injection means for injecting air into the subsurface regions below the contaminated zone to be remediated, surfactant separation means for separating the pollutants from the foam, and recycle means for recycling the separated surfactant and solvents to said foam generation means.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for in-situ remediation of contaminated soils comprising:
    introducing at least one treating agent into a contaminated soil; and
    transporting said at least one treating agent to an underground in-situ treatment zone of said contaminated soil by means of a foam-based fluid.

2. A process in accordance with claim 1, wherein said at least one treating agent is an agent selected from the group consisting of nutrients, trace metals, bacterial cultures, oxidants, solvents, surfactants and mixtures thereof.

3. A process in accordance with claim 1, wherein said foam-based fluid is introduced into the contaminated soil through at least one of a vertical well and a horizontal well.

4. A process in accordance with claim 1, wherein placement of said foam-based fluid in said treatment zone is controlled by generation of at least one pressure gradient within said contaminated soil.

5. A process in accordance with claim 4, wherein said at least one pressure gradient is established by means of at least one of slurry walls, vacuum extraction and air flows.

6. A process in accordance with claim 1, wherein said foam-based fluid adsorbs at least a portion of at least one pollutant in said contaminated soil and transports said at least one pollutant from said underground in-situ treatment zone to a surface region of said contaminated soil.

7. A process in accordance with claim 1, wherein said foam-based fluid is a foam comprising between about 5% and about 50% of a liquid and between about 50% and about 95% of a gas.

8. A process in accordance with claim 1, wherein said foam-based fluid comprises an organic foam.

9. A process in accordance with claim 8, wherein an organic fraction of said foam-based fluid is absorbed into an organic, non-aqueous phase liquids fraction of said contaminated soil.

10. A process in accordance with claim 1, wherein said foam-based fluid is biodegradable.

11. A process in accordance with claim 1, wherein said foam-based fluid comprises at-least one non-ionic surfactant.

12. A process in accordance with claim 1, wherein a foam in said foam-based fluid is collapsible in said underground in-situ treatment zone.

13. A process for in-situ remediation of contaminated soils comprising:
    introducing a foam into a subsurface region below a contaminated soil treatment zone;
    flowing said foam through said contaminated soil treatment zone, at least one of absorbing and adsorbing at least one pollutant in said contaminated soil treatment zone, forming a pollutant-laden foam;
    removing said pollutant-laden foam from said contaminated soil treatment zone; and
    separating said at least one pollutant from said pollutant-laden foam.

14. A process in accordance with claim 13, wherein said foam comprises at least one additive selected from the group consisting of peanut oil, solvents, oxidants, heavy metal chelating agents, and mixtures thereof.

15. A process in accordance with claim 13, wherein said foam comprises a plurality of bubbles having a bubble size in the range of about 10 microns to about 5 millimeters in diameter.

16. A process for enhancing in-situ remediation of contaminated soils comprising:
    introducing a foam into a contaminated soil treatment zone, said foam comprising charged surface properties; and
    applying at least one of an electrokinetic, electromagnetic, and radio frequency heating in-situ treatment process to said contaminated soil treatment zone.

* * * * *